(12) United States Patent
Lohman et al.

(10) Patent No.: US 7,562,090 B2
(45) Date of Patent: Jul. 14, 2009

(54) SYSTEM AND METHOD FOR AUTOMATING DATA PARTITIONING IN A PARALLEL DATABASE

(75) Inventors: Guy Maring Lohman, San Jose, CA (US); Nimrod Megiddo, Palo Alto, CA (US); Jun Rao, San Jose, CA (US); Chun Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1303 days.

(21) Appl. No.: 10/324,362

(22) Filed: Dec. 19, 2002

(65) Prior Publication Data

US 2004/0122845 A1 Jun. 24, 2004

(51) Int. Cl.
*G06F 7/00* (2006.01)
*G06F 12/00* (2006.01)
(52) U.S. Cl. ..................... 707/102; 707/205
(58) Field of Classification Search ............. 707/1, 707/8
See application file for complete search history.

(56) References Cited

U.S. PATENT DOCUMENTS

| | | | | |
|---|---|---|---|---|
| 5,301,317 | A * | 4/1994 | Lohman et al. | 707/2 |
| 5,551,027 | A * | 8/1996 | Choy et al. | 707/201 |
| 6,092,062 | A | 7/2000 | Lohman et al. | 707/2 |
| 6,112,198 | A | 8/2000 | Lohman et al. | 707/3 |
| 6,223,182 | B1 | 4/2001 | Agarwal et al. | 707/102 |
| 6,282,570 | B1 * | 8/2001 | Leung et al. | 709/224 |

OTHER PUBLICATIONS

Lightstone et al., SIGMOD Record, vol. 31, No. 3, pp. 55-61, Sep. 2002.*
Rao et al., ACM SIGMOD, Jun. 4-6, 2002, Madison, Wisconsin, USA, pp. 558-569.*
Valenin et al., IEEE, pp. 101-110, 2000.*
Baru et al., IBM Systems Journal, vol. 34, No. 2, pp. 292-322, 1995.*
Zilio, Daniel C., "Physical Database Design Decision Algorithms and Concurrent Reorganization for Parallel Database Systems", PhD thesis, University of Toronto, 1998, pp. 1-277.*
Kossman et al., ACM Transactions on Database Systems, vol. 25, No. 4, Dec. 2000, pp. 517-558.*
"Query-Driven Horizontal Class Partitioning for Object-Oriented Databases", Bellatreche et al. Proceedings of the 9th International Conference on Databases and Expert Systems (DEXA'98), Lecture Notes in Computer Science 1460, Vienna, Austria, Aug. 1998, pp. 692-701.
"Optimal Balanced Assignments and Parellel Database Application", Ghandeharizadeh et al. ORSA Journal on Computing, 5(2):151-167, Spring 1993.

(Continued)

*Primary Examiner*—Cheyne D Ly
(74) *Attorney, Agent, or Firm*—John L. Rogitz

(57) ABSTRACT

A system for automating data partitioning in a parallel database includes plural nodes connected in parallel. Each node includes a database server and two databases connected thereto. Each database server includes a query optimizer. Moreover, a partitioning advisor communicates with the database server and the query optimizer. The query optimizer and the partitioning advisor include a program for recommending and evaluating data table partitions that are useful for processing a workload of query statements. The data table partitions are recommended and evaluated without requiring the data tables to be physically repartitioned.

7 Claims, 7 Drawing Sheets

OTHER PUBLICATIONS

Abstract: "Microsoft Index Tuning Wizard for SQL Server 7.0", by S. Narasayya V. Chaudhuri. ACM SIGMOD International Conference on Management of Data, SIGMOD Rec. (USA) vol. 27, No. 2, pp. 553-554. Seattle, WA. Jun. 1-4, 1998.

"Automated Selection of Materialized Views and Indexes for SQL Databases". Agrawal et al. Proceedings of the 26th International Conference on Very Large Databases, pp. 496-505. Cairo, Egypt 2000.

"Vertical Partitioning Algorithms for Database Design". Navathe et al. ACM Transactions on Database Systems, vol. 9, No. 4, pp. 680-710. Dec. 1984.

* cited by examiner

SYSTEM AND METHOD FOR AUTOMATING DATA PARTITIONING IN A PARALLEL DATABASE

FIELD OF THE INVENTION

The present invention relates generally to computer software, and more specifically to database management software operating in parallel database systems.

BACKGROUND OF THE INVENTION

Database systems increasingly rely upon parallelism to achieve high performance and large capacity. Rather than relying upon a single monolithic processor, parallel systems exploit fast and inexpensive microprocessors to achieve high cost effectiveness and improved performance. The popular shared-memory architecture of symmetric multiprocessors is relatively easy to parallelize, but cannot scale to hundreds or thousands of nodes, due to contention for the shared memory by those nodes. Shared-nothing parallel systems, on the other hand, interconnect independent processors via high-speed networks. Each processor stores a portion of the database locally on its disk. These systems can scale up to hundreds or even thousands of nodes, and are the architecture of choice for today's data warehouses that typically range from tens of terabytes to over one hundred (100) terabytes of online storage. High throughput and response times can be achieved not only from inter-transaction parallelism, but also from intra-transaction parallelism for complex queries.

Because data is partitioned among the nodes in a shared-nothing system, and is relatively expensive to transfer between nodes, selection of the best way to partition the data becomes a critical physical database design problem. A suboptimal partitioning of the data can seriously degrade performance, particularly of complex, multi-join "business intelligence" queries common in today's data warehouses. Selecting the best way to store the data is complex, since each table can be partitioned in many different ways to benefit different queries, or even to benefit different join orders within the same query. This puts a heavy burden on database administrators, who have to make many trade-offs when trying to decide how to partition the data, based upon a wide variety of complex queries in a workload whose requirements may conflict.

Previous efforts have chosen partitions heuristically or have created a performance model separate from the optimizer. Heuristic rules unfortunately cannot take into consideration the many inter-dependent aspects of query performance that modern query optimizers do.

Accordingly, the present invention recognizes a need for a tool that can be used to automate the process of partition selection.

SUMMARY OF THE INVENTION

A computer program device for automatically partitioning data in a parallel database includes logic means for recommending a candidate partition for data table and logic means for evaluating that candidate partition based in part on a workload of query statements. Further, the computer program device includes logic means for efficiently finding the optimal partition for each table such that the overall cost of the workload is minimized.

Preferably, the computer program device includes logic means for generating the optimal partition for each table for a given query and a corresponding cost. Also, in a preferred embodiment, the optimal partition is recommended by logic means for computing a list of partitions that can potentially reduce the cost of a query and exploiting the cost model in an optimizer to estimate the cost of the query by using each candidate partition. Also, the computer program device includes logic means for reducing the number of candidate partitions for each base table without losing plan quality.

Preferably, the computer program device further includes logic means for generating candidate partitions from precomputed interesting partitions and local equality predicates. In a preferred embodiment, the candidate partition is generated in existing node groups by avoiding redundant partitions in identical node groups or single-node node groups.

In another aspect of the present invention, a method for evaluating a set of candidate partitions includes logic means for replacing the original partitions for each table in a query and logic means for using the cost model in an optimizer to estimate the cost of the query under such a configuration.

In yet another aspect of the present invention, a system is provided for efficiently enumerating combinations of candidate partitions and selecting the optimal partitions such that the overall cost of a workload is minimized.

In yet still another aspect of the present invention, a system for automating the design of data partitioning in a parallel database includes plural nodes connect to each other. Each node includes a database server that is connected to a database. Each database server includes a query optimizer. A partitioning advisor communicates with the database server and the query optimizer. The query optimizer and partitioning advisor include a program for recommending and evaluating data table partitions useful for processing a workload of query statements without requiring tables to be repartitioned.

The preferred embodiment of the present invention will now be described, by way of example, with reference to the accompanying drawings, in which:

DESCRIPTION OF AN EMBODIMENT OF THE INVENTION

Figure 1:
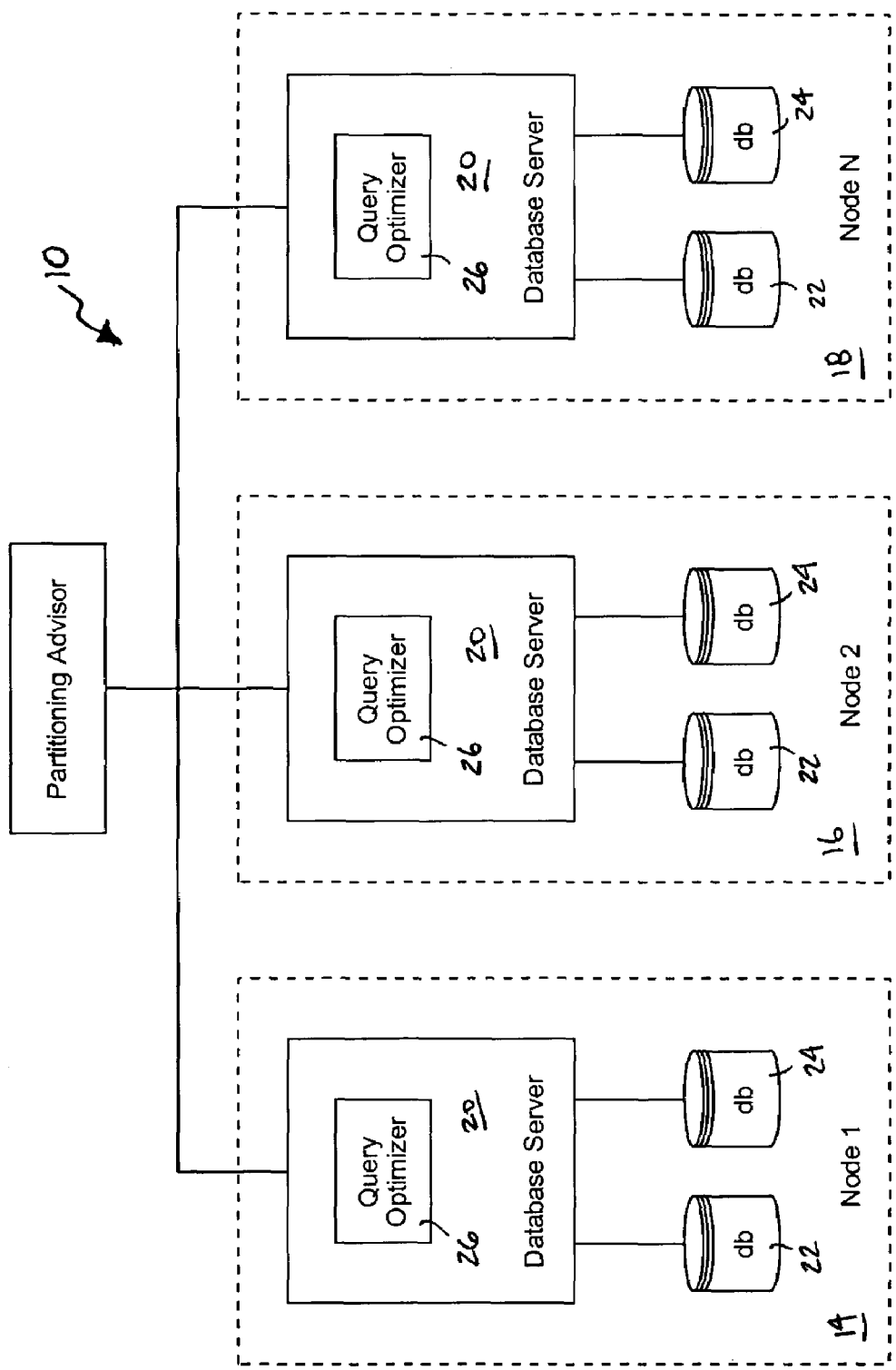
FIG. 1 is a block diagram of a system architecture.

Referring initially to FIG. 1, the system architecture is shown and is generally designated 10. FIG. 1 shows that the system 10 includes first node 14, a second node 16, and an nth node 18. As shown, each node 14, 16, 18 is preferably identical and includes a database server 20 that is connected to a first database 22 and a second database 24. It can be appreciated that the nodes 14, 16, 18 may be different, but for optimal performance they are identical. Moreover, it can be appreciated that the system 10 can include more than the three nodes 14, 16, 18 shown and each node can include more than the two databases 22, 24 shown. Also, each database server 20 includes a query optimizer 26. A separate partitioning advisor 28 is connected to the database servers 20, specifically the query optimizer 26.

It is to be understood that the preferred system, as shown in FIG. 1, is a shared-nothing system in which each node can be used to execute queries in parallel. A given query can be broken up into subtasks and all of the subtasks are executed in parallel. To enable the parallelism, the data tables are partitioned horizontally across the nodes 14, 16, 18. Typically, the rows of a table are assigned to a particular node 14, 16, 18 by applying a deterministic partitioning to a subset of the columns called the "partitioning key" of the table. Currently DB2, a relational database management system (RDBMS), supports hash-based partitioning in which multiple node groups can be defined. A node group can be assigned to any subset of the nodes in a system and a table can be partitioned among all nodes in a node group or replicated across all of the nodes in a node group. A partition of a table is given by a (node group, partitioning key) pair or simply the node group if the table is to be replicated.

Preferably, the query optimizer 26 is a conventional bottom-up optimizer that uses dynamic programming to prune dominated alternatives. In a parallel environment, the optimizer 26 considers several partitioning alternatives for (equality) joins. If two tables are both partitioned on their respective join columns (and are in the same node group), the join between the two tables can be performed locally at each node using a local join. Otherwise, at least one of the participating tables has to be moved. If only one of the tables, (table A) is partitioned on the join column, then the other table (table B) must be re-partitioned on the join column to the node group of table A, e.g., by hashing each row in table B on its join column and moving it to the proper node in the node group of table A. This join method is known as a directed join. Alternatively, the optimizer can replicate all rows from table B to all nodes in table A. This join method is known as a broadcast join. Finally, if neither table is partitioned on the join column, the optimizer could decide to repartition both tables over any arbitrary set of nodes using the join key as the partitioning key. This method is known as a repartitioned join. Typically, local joins are cheaper to implement than directed and broadcast joins, which, in turn, are cheaper than repartitioned joins.

It is to be understood that, in a preferred embodiment, the database server 20 and the partitioning advisor 28 can run on multiple platforms, e.g., a Unix computer, a Linux computer, or an OS/2 server, or a Windows NT server. Unix is a registered trademark of The Open Group in the United States and other countries. OS/2 is a registered trademark of International Business Machines Corporation in the United States, other countries, or both. Windows NT is a trademark of Microsoft Corporation in the United States, other countries, or both. Moreover, the partitioning advisor 28 includes a series of computer-executable instructions, as described below, which will allow the partitioning advisor 28 to automatically select cost-effective partitions. These instructions may reside, for example, in random access memory (RAM) of a computer running the partitioning advisor 28.

Alternatively, the instructions may be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
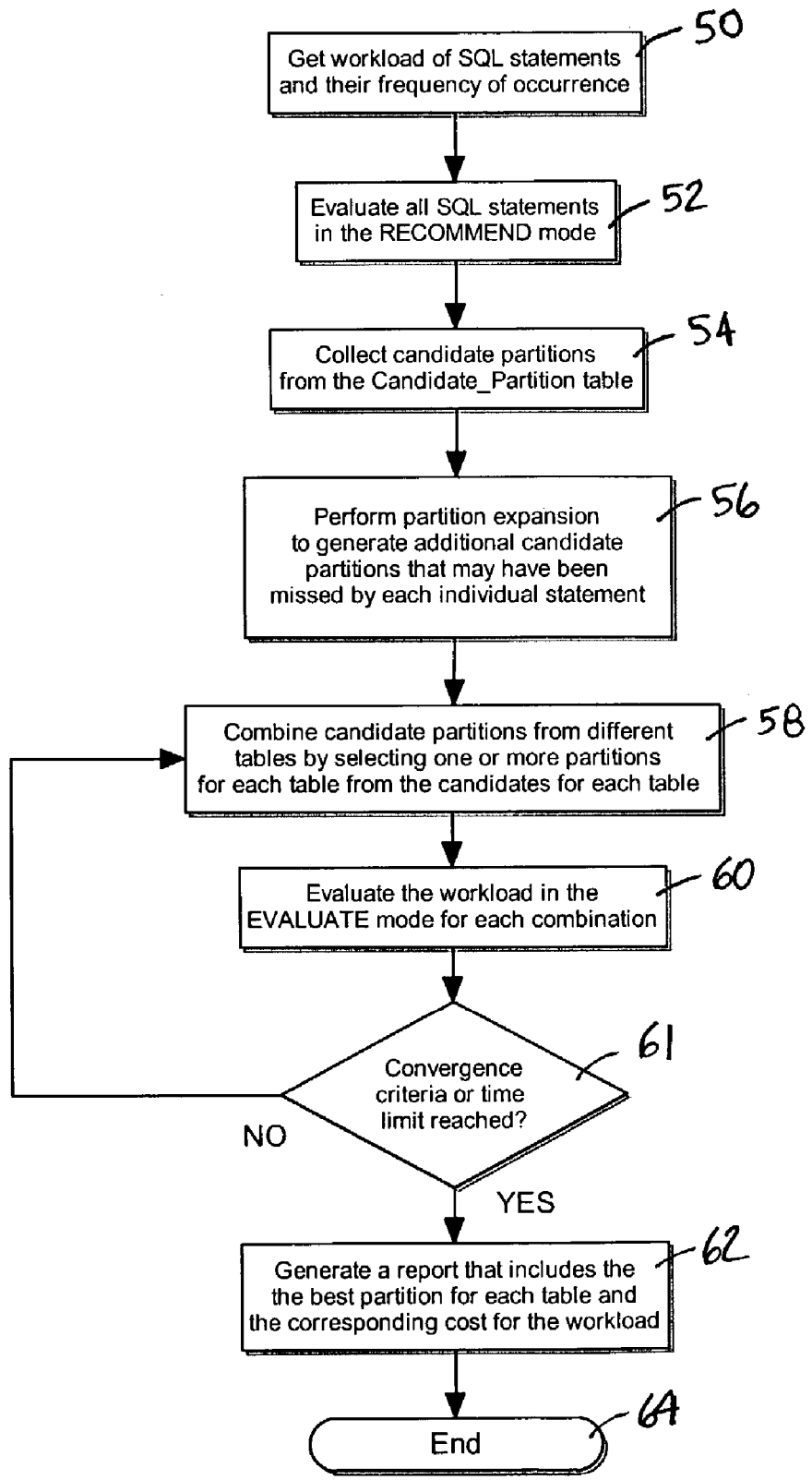
FIG. 2 is a flow chart of the overall operating logic of the present invention.

Referring to FIG. 2, the overall operating logic of the present invention is shown and commences at block 50 wherein a workload of database query statements, e.g., structured query language (SQL) statements, and their frequency of occurrence are obtained. At block 52, all of the query statements are evaluated in the RECOMMEND mode. In RECOMMEND mode the optimizer recommends the best candidate partitions for each query statement and propagates them in a CANDIDATE_PARTITION table. Candidate partitions are those partitions which can potentially reduce the cost of processing a query. Preferably, the potential cost reduction can be determined using a cost-model, well known in the art, typically found in an optimizer. Moving to block 54, candidate partitions are collected from the CANDIDATE_PARTITION table. Those candidate partitions are the best partitions for at least one of the queries in the workload. At block 56, a partition expansion is performed in order to generate additional candidate partitions that may have been missed by each individual query statement. Continuing to block 58, candidate partitions from different tables are combined by selecting one or more partitions for each table from the candidates for each table. The candidate partitions can be combined using the rank-based enumeration algorithm or randomized enumeration algorithm described below. At block 60, the workload of SQL statements are evaluated in the EVALUATE mode for each combination of candidate partitions. Moving to decision diamond 61, it is determined if a convergence criteria or a predetermined time limit has been reached. If not, the logic returns to block 58 and continues as described above. Otherwise, the logic proceeds to block 62 where the best partition for each table and the corresponding cost for implementing the workload of statements is output, e.g., by generating a report. For example, this output can be a report. Preferably, the report includes the best partition for each underlying data table and the corresponding cost for the entire workload of query statements. The logic then ends at state 64.

Figure 3:
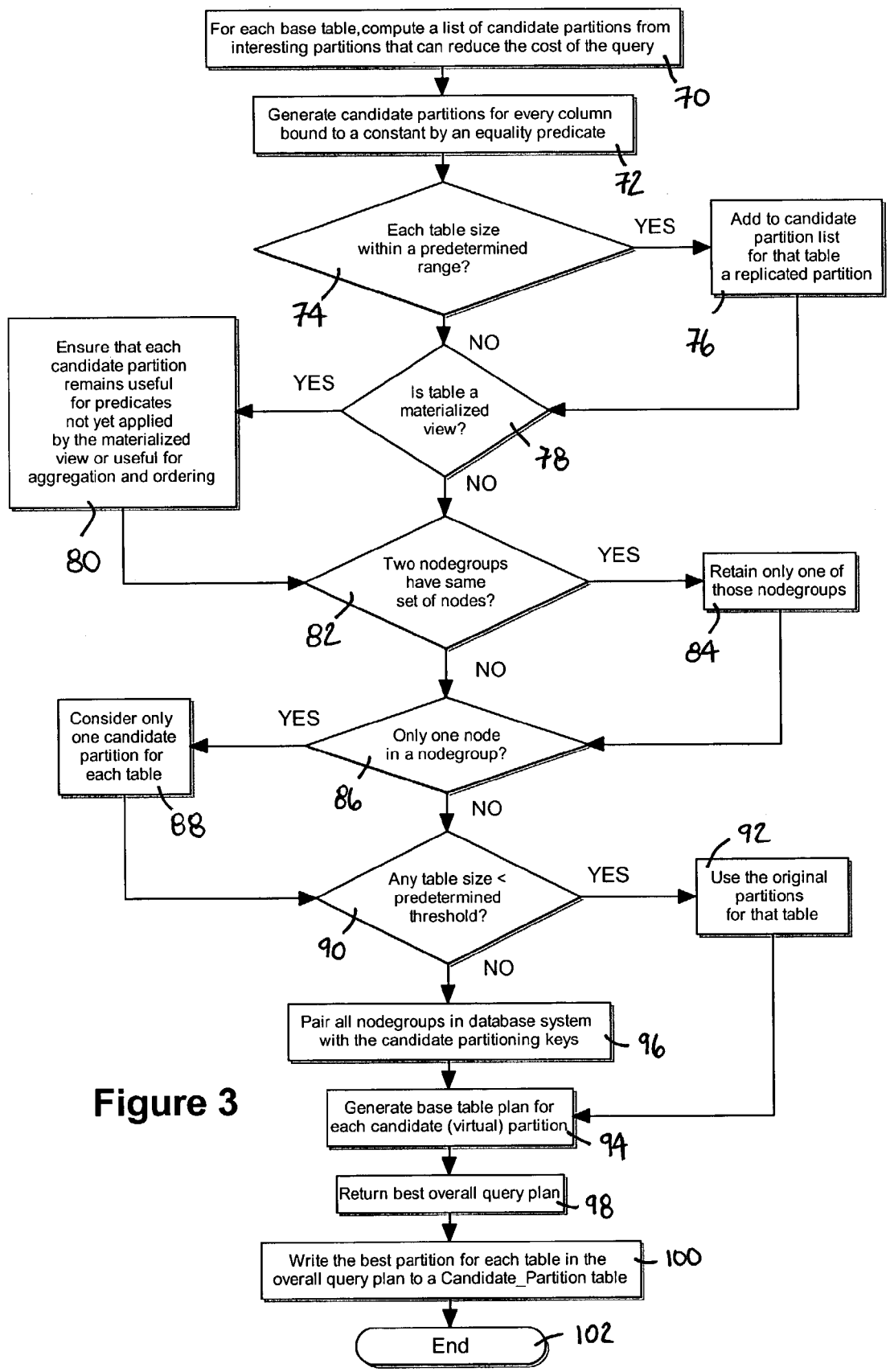
FIG. 3 is a flow chart of the RECOMMEND mode logic.

Referring now to FIG. 3, the detailed RECOMMEND mode logic is shown and commences at block 70, where for each base table, a list of candidate partitions is computed from interesting partitions that can potentially reduce the cost of processing the workload of query statements. Interesting partitions are very similar to interesting orders which include row orders that are beneficial in evaluating a particular query statement. The optimizer 26 retains the least expensive sub-plan that produces rows in each "interesting" order and the least expensive "unordered" sub-plan. The sub-plans with interesting orders can make later operations, e.g., merge join, aggregation, and ordering, less expensive by avoiding having to re-order, i.e., sort, the rows into some new order for that operation. In a parallel environment, DB2 also pre-computes beneficial partitions for particular query statements as its "interesting" partitions. Similar to interesting orders, sub-plans having interesting partitions can make an entire plan for processing a workload of query statements less expensive. In DB2, the optimizer retains the best sub-plan for each interesting partition, in addition to each interesting order.

DB2, for example, considers the following partitioning keys to be interesting: columns referenced in equality join predicates and any subset of grouping columns. Join columns are considered interesting because they make local and directed joins possible. Grouping columns are considered interesting because aggregations can be completely done locally at each node and then concatenated. The interesting partitions are generated before plan generation starts and are accumulated and mapped to each participating base table in the query.

Returning to the RECOMMEND mode logic, at block 72, candidate partitions are also generated for each column bound to a constant by an equality predicate. Proceeding to decision diamond 74, it is determined whether each referenced data table size is within a predetermined range. If so, the logic moves to block 76, where a replicated partition is added to the candidate partition list for each table that is within the range. Replication is a type of candidate partition that can reduce communication cost and can improve query performance. However, since replication has storage overhead, it is not preferable to replicate very large tables.

From block 76, or if the table size is not within a predetermined range at decision diamond 74, the logic moves to decision diamond 78 where it is determined whether the table being considered is a materialized view. A materialized view is a query result for a predetermined query, e.g., a query that is used often, that is physically stored. Materialized views can dramatically increase query performance. If the table is a materialized view the logic moves to block 80 where it is ensured that each candidate partition remains useful for predicates not yet applied by the materialized view or useful for future aggregation and ordering.

From block 80, or from decision diamond 78 if there is not a materialized view, the logic moves to decision diamond 82 where it is determined whether any two node groups have the same set of nodes. If so, the logic continues to block 84 where one of the redundant node groups is eliminated so that only one of those node groups are retained. This will help limit the number of candidate partitions considered and reduce the search space in RECOMMEND mode without sacrificing the quality of the recommended plans too much. From block 84, or from decision diamond 82 if there are not two node groups with the same set of nodes, the logic moves to decision diamond 86. At decision diamond 86, it is determined whether the node group is a single-node. If so, the logic continues to block 88 where only one candidate partition is considered within the node group for each underlying data table. Thereafter, the logic moves to decision diamond 90. Decision diamond 90 can also be reached if there is more than one node group at decision diamond 86. At decision diamond 90, it is determined whether any table size is less than a predetermined threshold. If any table size is indeed below the predetermined threshold, the logic moves to block 92 and the original partitions are used for that table. It is to be understood that for very small tables the original partitions can be used since using different partitions for small data tables only slightly affects the final plan cost. From block 92, the logic moves to block 94 and a base table plan is generated for each candidate, or virtual, partition.

Returning to decision diamond 90, if the table size is greater than the predetermined threshold, the logic moves to block 96 and all node groups in the database system are paired with the candidate partitioning keys. The logic then moves to block 94, described above, where a base table plan is generated for each candidate partition. Continuing to block 98, the best overall query plan is returned using the usual logic of the optimizer, well known in the art. Then, at block 100, the best partition for each table in the overall query plan is written, e.g., to a CANDIDATE_PARTITION table. It is to be understood that the CANDIDATE_PARTITION table is one exemplary, non-limiting means for communicating the best partitions for each tables. The logic then ends at state 102.

It is to be understood that a very subtle problem can arise when a table is referenced multiple times in a workload of query statements. For example, when generating sub-plans, each table reference is considered independently. As a result, a plan can have two table scans that reference the same table with conflicting partitions. Such a plan is invalid, since a table can, in reality, be partitioned in only one way (except for materialized views or automatic summary tables). To solve this problem completely can be extremely expensive because it would require each sup-plan tree to be traversed all the way down to the leaves in order to compare partition information of the base tables. On the other hand, it is not crucial to recommend exactly one partition for a table, since these partitions are simply candidate partitions and are subject to further evaluations. Therefore, the optimizer can recommend different partitions for a single table within a single query.

Figure 4:
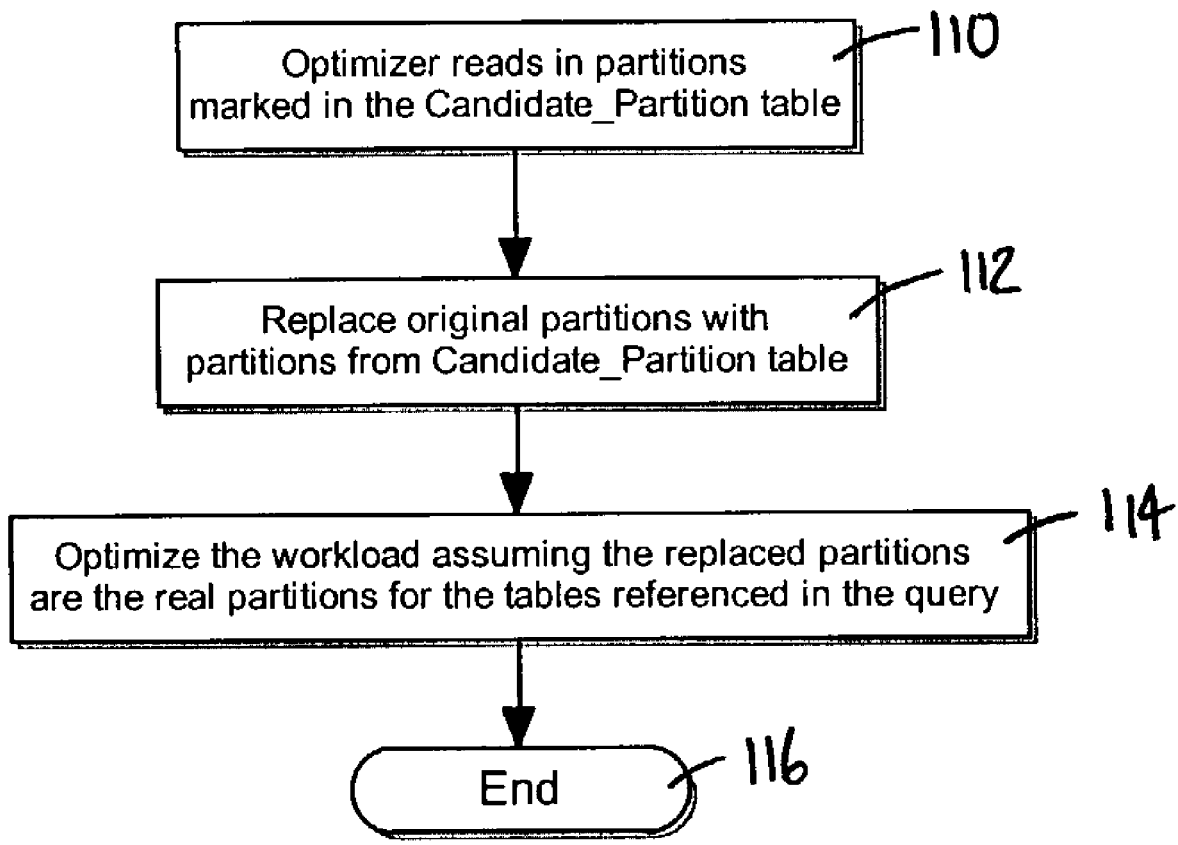
FIG. 4 is a flow chart of the EVALUATE mode logic.

Referring to FIG. 4, the EVALUATE mode logic is shown and commences at block 110, where the optimizer 26 reads in partitions that are marked in the CANDIDATE_PARTITION table. The marked partitions are those that are chosen to be most cost effective in performing the query in question. The partitions can be marked using the rank-based enumeration logic or the randomized enumeration logic described below. Moving to block 112, the original table partitions are replaced with partitions marked in the CANDIDATE_PARTITION. At block 114, the workload is optimized assuming that the replaced partitions are, in fact, the real partitions for tables referenced in the query. The logic then ends at state 116.

An important issue when evaluating partitions and query plans is the estimation of plan costs when real partitions of tables are changed to virtual partitions. Preferably, the plan costs can be determined using a cost-model, well known in the art, typically found in an optimizer. For example, DB2 uses a detailed cost model to estimate query cost. The overall cost is a linear combination of input/output (I/O) costs, central processing unit (CPU) costs, and communication costs. DB2 assumes that there is some overlap among the three components. DB2 collects various kinds of statistics on the database, including table cardinality, column cardinality (number of distinct values in a column), number of data pages in a table, index statistics, and optionally, distribution statistics such as histograms and a list of the most frequent values.

There are two kinds of statistics, one at the table level and one at a single node level (referred to as per-table and per-node statistics, respectively). Both sets of statistics are needed for cost estimation. For example, when estimating the I/O cost of a scan, the per-node level information (such as number of disk pages) is used. This is based on the assumption that the scan is performed in parallel across all of the nodes and is typically the way that DB2 uses to encourage parallelism. On the other hand, when collecting join results from all the nodes, e.g., for further operations such as aggregation, DB2 uses the per-table cardinality and join selectivity to estimate the number of rows to be received. This guarantees consistent join cardinality estimates independent of the manner in which the data is partitioned. After repartitioning, DB2 can derive per-node statistics from the per-table statistics based on how the data is partitioned. It happens that per-table statistics are independent of partitions, but per-node statistics change if the underlying partition changes.

Figure 5:
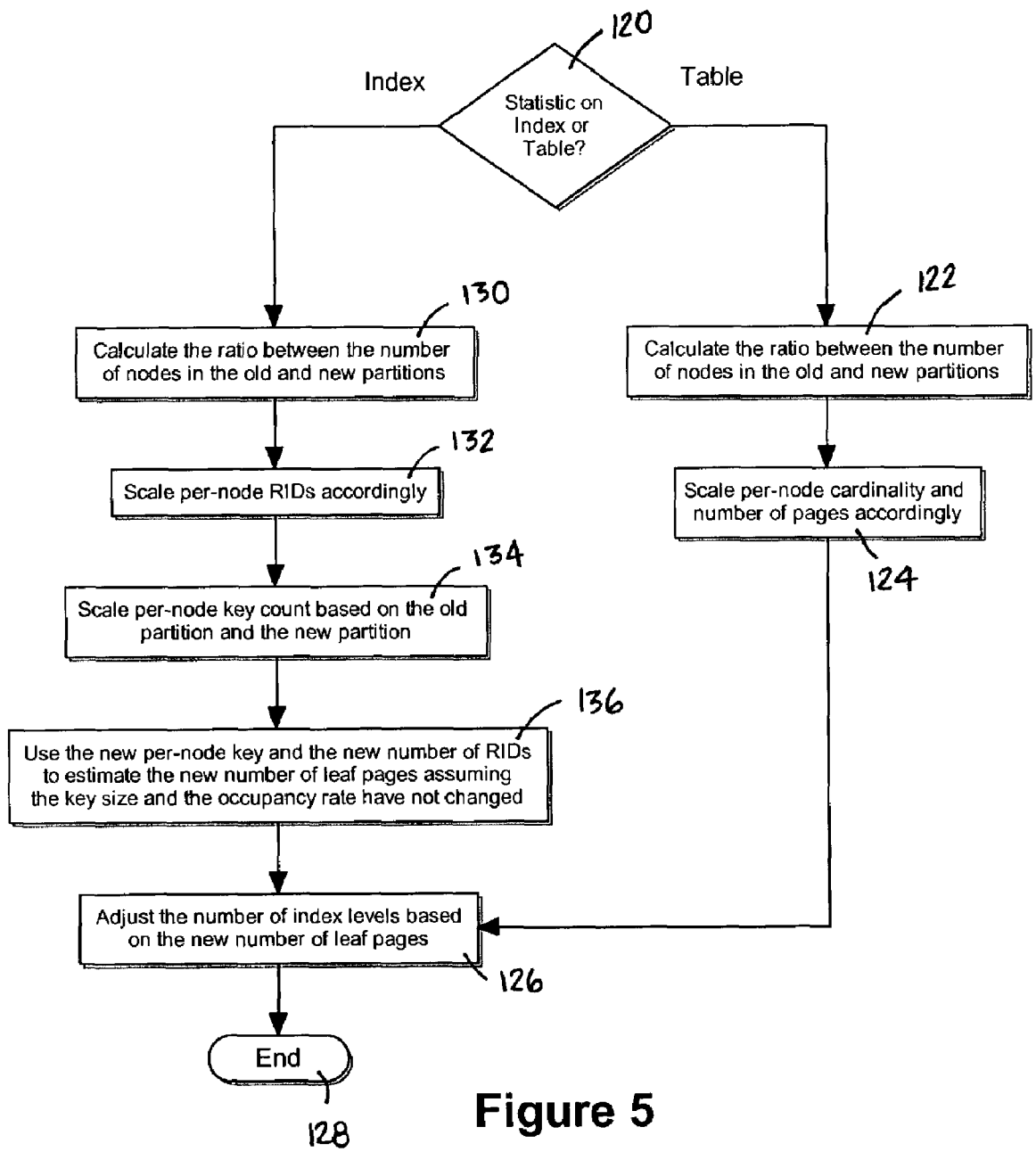
FIG. 5 is a flow chart of the statistic adjustment logic.

FIG. 5 shows the statistics adjustment logic. Commencing at decision diamond 120, it is determined whether the statistic is an index statistic or a table statistic. If the statistic is a table statistic, the logic moves to block 122 where the ratio between the number of nodes in the old and new partitions is calculated. Next, at block 124, the per-node cardinality and number of leaf pages are scaled accordingly. Moving to block 126, the number of index levels are adjusted based on the new number of leaf pages. The logic then ends at state 128.

Returning to decision diamond 120, if the statistic is an index statistic, the logic moves to block 130 and the ratio between the number of nodes in the old and new partitions is calculated. At block 132, the per-node row identifiers (RIDs) are scaled accordingly. Then, at block 134, the per-node key count is scaled based on the old partition and the new partition. Proceeding to block 136, the new per-node key and the new number of RIDs are used to estimate the new number of leaf pages, assuming the key size and the occupancy rate have not changed. The logic then moves to block 126 and the number of index levels are adjusted based on the new number of leaf pages. The logic then ends at state 128.

It is to be understood that when estimating new statistics, one assumption that is made is a uniform distribution of values. However, this assumption can prove faulty if the data is skewed, e.g., when there are very few key values in the partitioning key relative to the number of nodes, or values, that are not distributed evenly by the hashing function. The latter can be alleviated by the ability in DB2 to define alternative mappings from the hash buckets to nodes (a level of indirection). To avoid the former case in the RECOMMEND mode, the key count of each candidate partition is checked and only partitions having key values greater than a predetermined threshold are considered. The threshold is proportional to the number of nodes 14, 16, 18 in the system 10.

Figure 6:
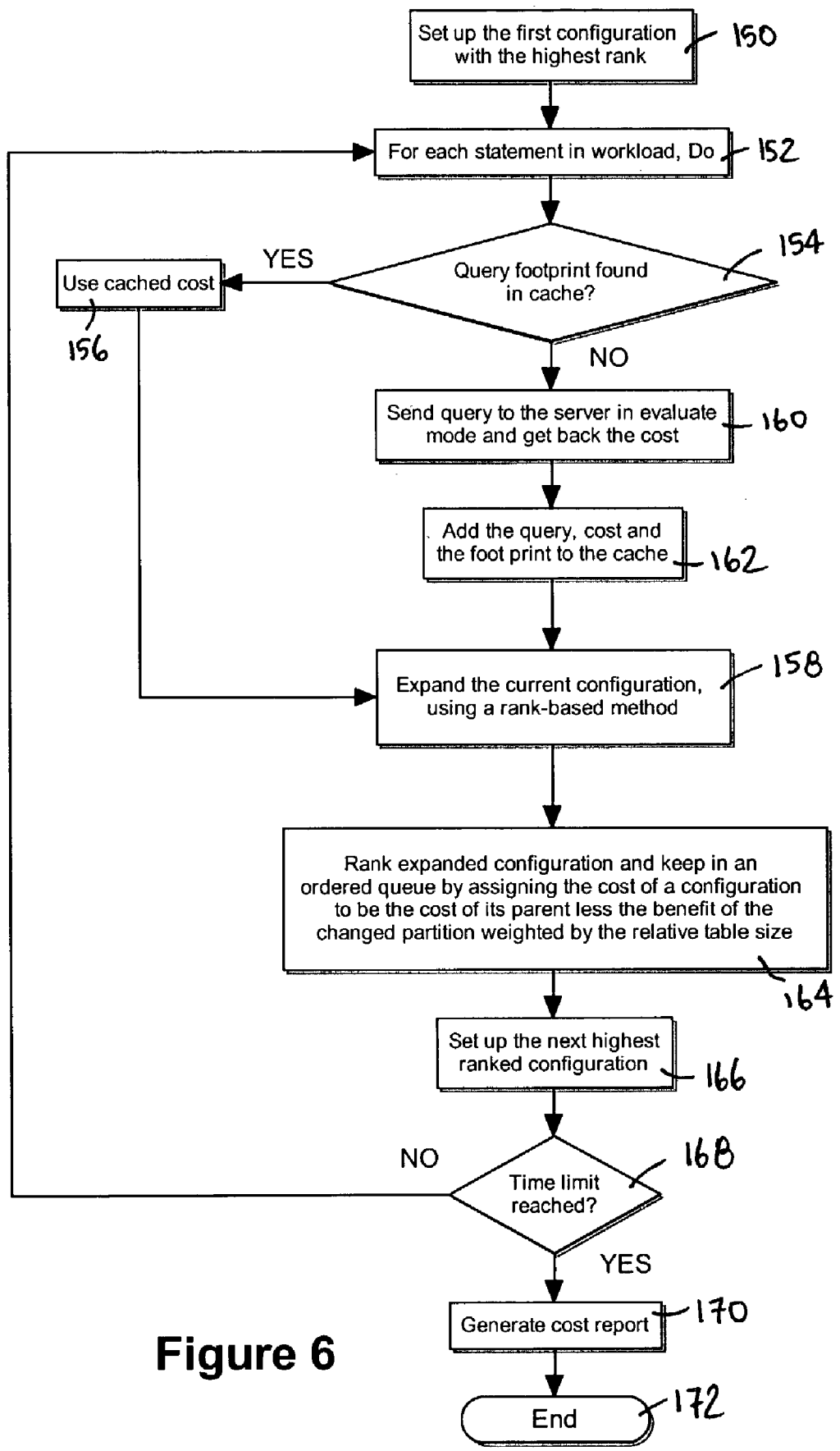
FIG. 6 is a flow chart of the rank-based enumeration logic.

Referring to FIG. 6, the rank-based enumeration logic is shown and commences at block 150, wherein the first configuration with the highest rank is established. Moving to block 152 a do loop is entered wherein for each statement in the workload, the following steps are performed. At decision diamond 154 it is determined whether a particular query footprint is found in a memory cache. If so, the logic moves to block 156, where the cached cost is used. The logic then continues to block 158 where the current configuration is expanded beginning with the root node that corresponds to the configuration with each table using the partition having the highest benefit value among the candidate partitions.

Returning to decision diamond 154, if the query footprint is not found in the memory cache, the logic moves to block 160 where the query is sent to the database server 20 in EVALUATE mode and the cost of the query is obtained. Then, at block 162, the query, its cost, and its footprint are added to the memory cache. The logic then moves to block 158 described above.

Proceeding to block 164, the expanded configurations are ranked and kept in an ordered queue. The expanded configurations are ranked by assigning the cost of the configuration to be the cost of its parent less the benefit of the changed partition weighted by the relative table size. Thereafter, at block 166, the next highest ranked configuration is established. Continuing to decision diamond 168, it is determined whether a stopping criteria has been reached. In a preferred embodiment, the stopping criteria is a predetermined time limit. If the stopping criteria has not been reached, the logic returns to block 152 and continues as described above for the next highest ranked configuration established in block 166. If the stopping criteria has been reached, the logic moves to block 170 where the best partitions and the corresponding costs are output, e.g., in a report. The logic then ends at state 172.

Figure 7:
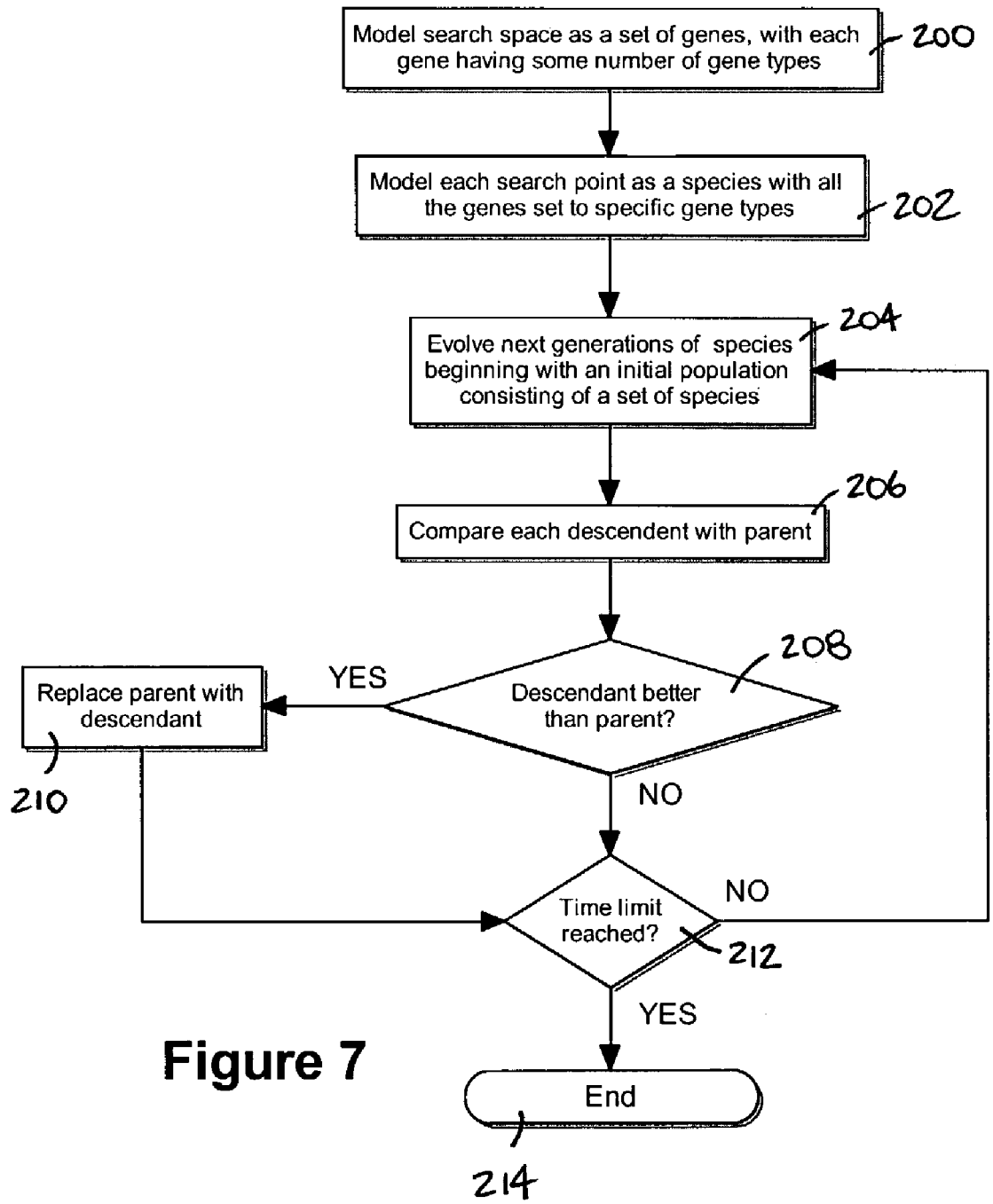
FIG. 7 is a flow chart of the randomized enumeration logic.

Referring now to FIG. 7, the randomized enumeration logic is shown and commences at block 200, where the search space is modeled as a set of genes, with each gene having some number of gene types. Next, at block 202, each search point is modeled as a species, with all the genes set to specific gene types. Moving to block 204, beginning with an initial population consisting of a set of species, the next generation of species are evolved. At block 206, each descendent is compared with its parent. Continuing to decision diamond 208, it is determined whether each descendant is more beneficial, e.g., cost efficient, than its parent. If so, the logic moves to block 210 and the parent is replaced with its descendent. From block 210, or if the descendent is not more beneficial than its parent, the logic moves to decision diamond 212 where it is determined whether a stopping criteria has been reached. In a preferred embodiment, the stopping criteria is a predetermined time limit. If the stopping criteria has been reached, the logic ends at state 214. Otherwise, the logic returns to block 204 and continues as described above.

With the configuration of structure described above, it is to be appreciated that system and method described above provides a means for automating the process of partition selection by using cost estimates provided by the query optimizer 26. The optimizer's cost estimates are used to suggest possible partitions and to compare them in a quantitative way that considers the interactions between multiple tables within a given workload. This approach avoids redundancy and possible inconsistency between the partition advisor and the query optimizer. The partitioning advisor can be used, e.g., when loading a prospective database, migrating a database to a different platform or a different vendor, when the workload on a database changes substantially, when new tables are added, when the database is heavily updated, and/or when database performance has degraded.

While the particular SYSTEM AND METHOD FOR AUTOMATING DATA PARTITIONING IN A PARALLEL DATABASE as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for automatically partitioning data in a parallel database, comprising:

recommending at least one candidate partition for at least one data table in a databased sever based in part on a workload of query statements referencing the data table;

using a query optimizer, evaluating the candidate partition based in part on the workload of query statements to determine a cost of using the candidate partition by using statistics and replacing original partitions in a workload of query statements with candidate partitions and adjusting at least some of the statistics used in the evaluating act least in part by:

determining a ratio between a number of nodes in a prior partition and a number of nodes in a new partition to generate an output; and at least in part using the output, adjusting a number of index levels.

2. The method of claim 1, further comprising:

determining a best candidate partition for at least one data table and a corresponding cost at least partially based on the best candidate partition.

3. The method of claim 2, further comprising: combining the candidate partition with at least one other candidate partition; and evaluating a combination of candidate partitions to determine a cost using the combination.

4. The method of claim 1, wherein the candidate partition is recommended by:

computing a list of candidate partitions for each base table of a database that can reduce a cost of processing at least one query statement.

5. The method of claim 4, further comprising: reducing the number of candidate partitions for each base table without losing plan quality.

6. The method of claim 1, further comprising:

evaluating the workload of query statements with candidate partitions in place of the original partitions.

7. The method of claim 1, wherein the candidate partition is recommended at least partially based on a predetermined cost model and the candidate partition is evaluated at least partially based on the predetermined cost model.

* * * * *